(12) United States Patent
Nakanishi

(10) Patent No.: US 8,792,012 B2
(45) Date of Patent: Jul. 29, 2014

(54) IMAGE PROCESSING DEVICE, SYSTEM, AND METHOD FOR CORRECTING FOCAL PLANE DISTORTION USING A MOTION VECTOR

(75) Inventor: Keiri Nakanishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 424 days.

(21) Appl. No.: 13/205,074

(22) Filed: Aug. 8, 2011

(65) Prior Publication Data

US 2012/0242869 A1 Sep. 27, 2012

(30) Foreign Application Priority Data

Mar. 24, 2011 (JP) ................................. 2011-066352

(51) Int. Cl.
*H04N 5/228* (2006.01)

(52) U.S. Cl.
USPC ..................................... 348/208.6; 348/208.1

(58) Field of Classification Search
USPC ........... 348/208.1, 208.4, 208.6, 208.13, 699, 348/241
See application file for complete search history.

(56) References Cited

U.S. PATENT DOCUMENTS

| 6,091,460 | A * | 7/2000 | Hatano et al. | 348/699 |
| 6,480,670 | B1 * | 11/2002 | Hatano et al. | 386/329 |
| 8,009,872 | B2 | 8/2011 | Kurata | |
| 2004/0109503 | A1 * | 6/2004 | Lee | 375/240.16 |
| 2007/0177037 | A1 * | 8/2007 | Kurata | 348/241 |
| 2012/0013796 | A1 * | 1/2012 | Sato | 348/441 |

FOREIGN PATENT DOCUMENTS

| JP | 2006-148496 A | 6/2006 |
| JP | 2007-208580 A | 8/2007 |

OTHER PUBLICATIONS

Notification of Reason for Rejection mailed May 7, 2013, in corresponding Japanese Patent Application No. 2011-066352 in four (4) pages.
Background Art Information, Toshiba, Aug. 27, 2010.

* cited by examiner

*Primary Examiner* — Nicholas Giles
(74) *Attorney, Agent, or Firm* — Knobbe Martens Olson & Bear LLP

(57) ABSTRACT

According to one embodiment, an image processing device includes a motion vector generator, a correction amount generator, and a correcting module. The motion vector generator is configured to generate a horizontal direction motion vector and a vertical direction motion vector of an input video signal photographed in an order of scanning lines. The correction amount generator is configured to generate a horizontal direction correction amount based on the horizontal direction motion vector and the vertical direction motion vector by each scanning line, and generate a vertical direction correction amount based on the vertical direction motion vector by a scanning line. The correcting module is configured to correct the input video signal to generate an output video signal based on the horizontal direction correction amount and the vertical direction correction amount.

17 Claims, 7 Drawing Sheets

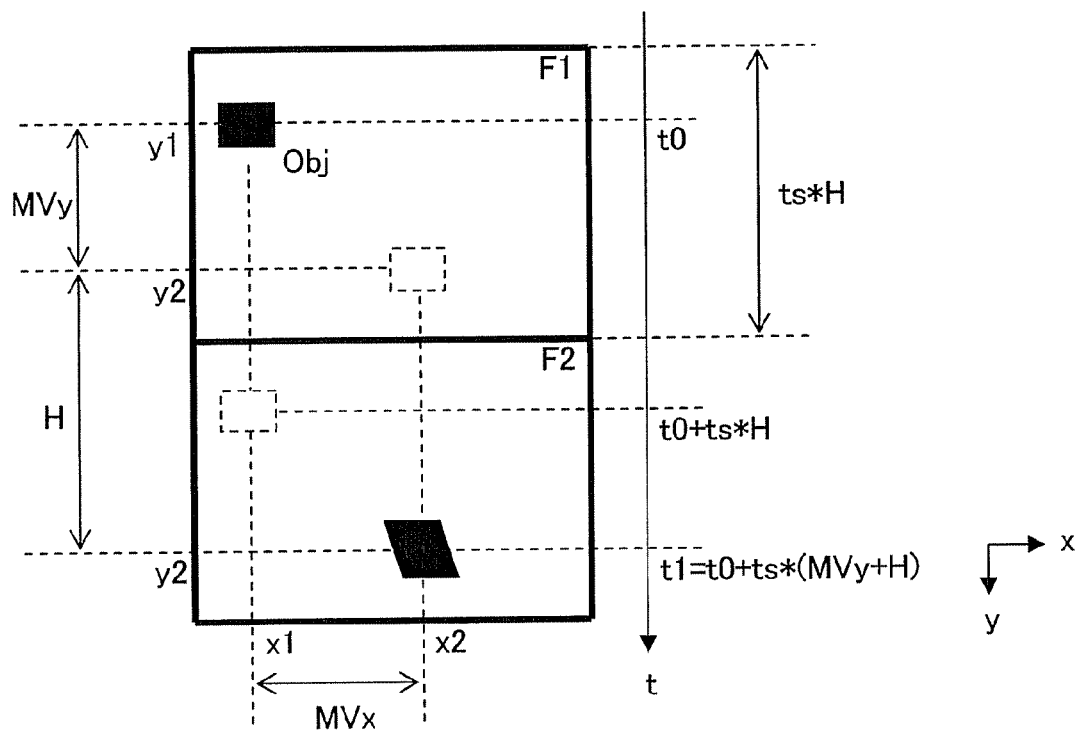
F I G. 1

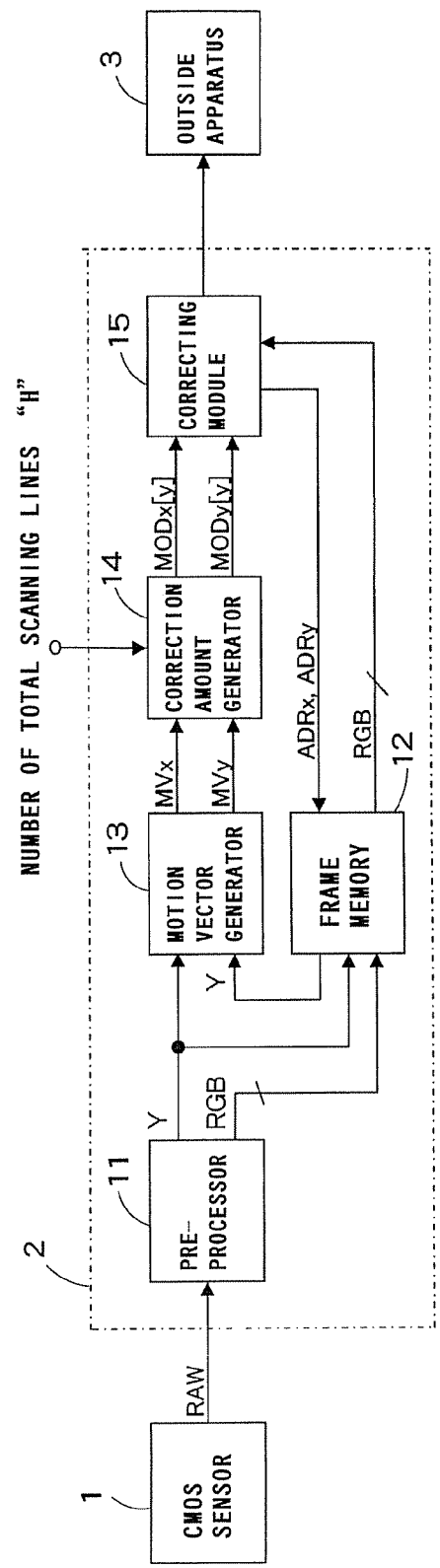
F I G. 2

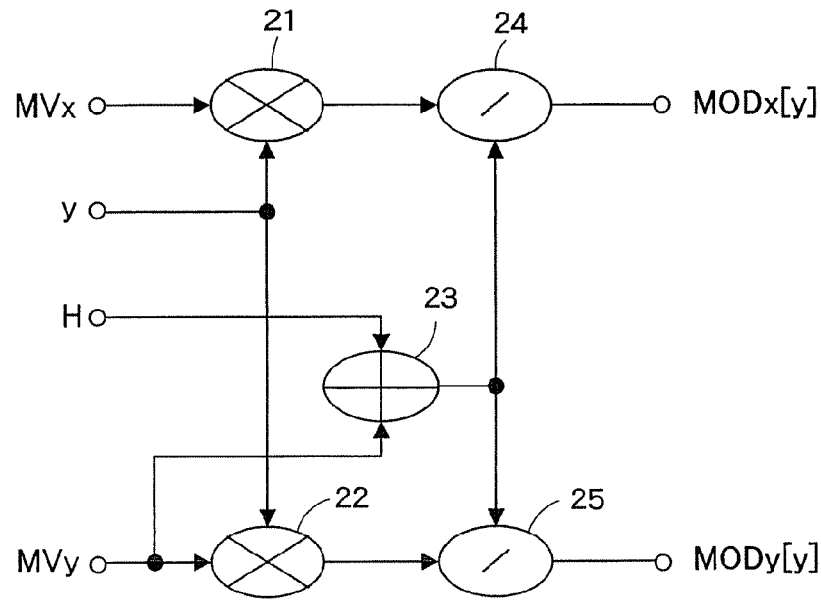
F I G. 3
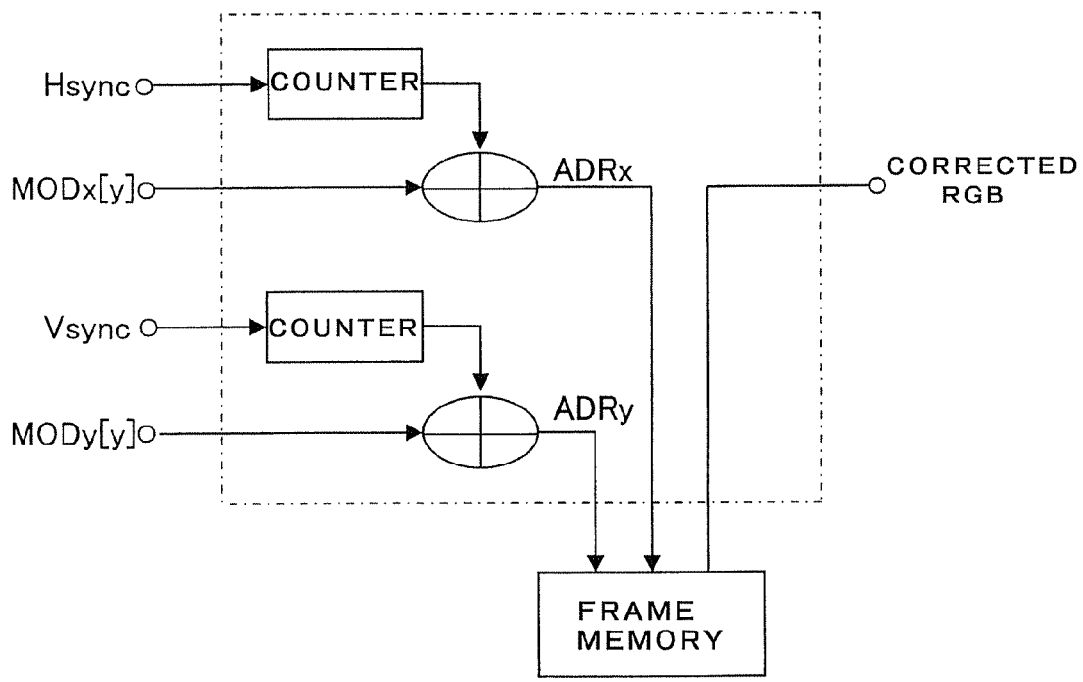
F I G. 4

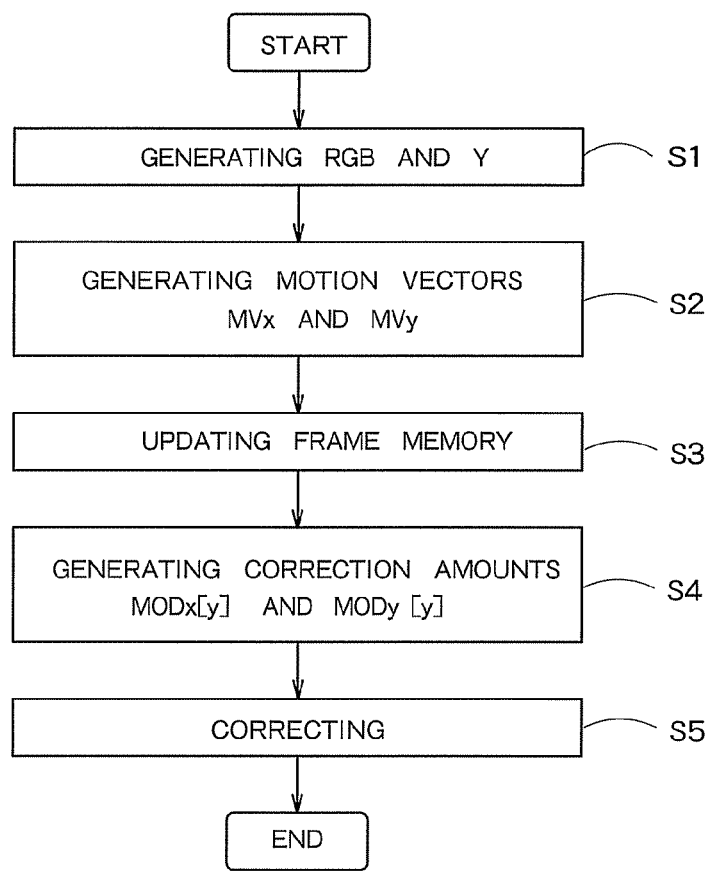
F I G. 5

● PIXEL POSITION READ OUT FROM FRAME MEMORY 12
□ PIXEL POSITION GENERATED BY INTERPOLATION

IMAGE PROCESSING DEVICE, SYSTEM, AND METHOD FOR CORRECTING FOCAL PLANE DISTORTION USING A MOTION VECTOR

CROSS REFERENCE TO RELATED APPLICATIONS

This application is based upon and claims the benefit of priority from the prior Japanese Patent Application No. 2011-66352, filed on Mar. 24, 2011, the entire contents of which are incorporated herein by reference.

FIELD

Embodiments described herein relate generally to an image processing device, an image processing system and an image processing method.

BACKGROUND

CMOS (Complementary Metal Oxide Semiconductor) sensors are often used in digital video cameras and so on because the CMOS sensors can be manufactured with low cost. It is general that the CMOS sensor photographs each scanning line by turns from the top part of the image to the bottom part thereof, which is called as a rolling shutter type, instead of photographing whole of a frame at the same time. Because timing when the top part of the image is photographed differs from timing when the bottom part of the image is photographed, there is a problem that moving object photographed by the CMOS sensor may be distorted. This distortion is called as a focal plane distortion.

BRIEF DESCRIPTION OF THE DRAWINGS

FIG. 1 is a diagram explaining a principle for correcting the focal plane distortion using a motion vector.

FIG. 2 is a schematic block diagram showing an image processing system according to a first embodiment.

FIG. 3 is a block diagram showing an example of an internal configuration of the correction amount generator 14.

FIG. 4 is a block diagram showing an example of an internal configuration of the correcting module 15.

FIG. 5 is a flowchart showing the processing operation of the image processing device 2.

FIG. 7 is a block diagram showing an internal configuration of the correction amount generator 14a.

DETAILED DESCRIPTION

Figure 6:
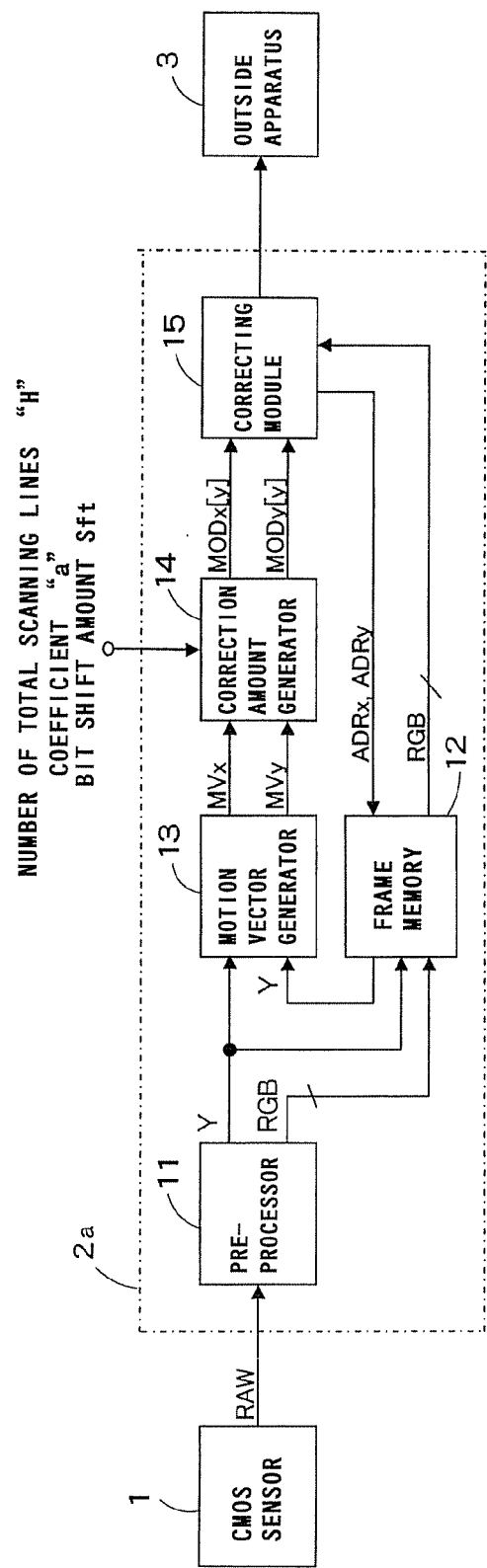
FIG. 6 is a schematic block diagram of the image processing system according to a second embodiment.

In general, according to one embodiment, an image processing device includes a motion vector generator, a correction amount generator, and a correcting module. The motion vector generator is configured to generate a horizontal direction motion vector and a vertical direction motion vector of an input video signal photographed in an order of scanning lines. The correction amount generator is configured to generate a horizontal direction correction amount based on the horizontal direction motion vector and the vertical direction motion vector by each scanning line, and generate a vertical direction correction amount based on the vertical direction motion vector by a scanning line. The correcting module is configured to correct the input video signal to generate an output video signal based on the horizontal direction correction amount and the vertical direction correction amount.

Embodiments will now be explained with reference to the accompanying drawings.

(First Embodiment)

FIG. 1 is a diagram explaining a principle for correcting the focal plane distortion using a motion vector. FIG. 1 shows two successive frames F1 and F2 photographed by a CMOS sensor of the rolling shutter type.

The CMOS sensor does not photograph whole of the frame F1 at the same time, but photographs each scanning line by turns from the top part of the image to the bottom part of the image. When time necessary to photograph one scanning line is defined as "ts" and the number of the total scanning lines of each frame is defined as "H", it takes time ts*H for the CMOS sensor to photograph all of the scanning lines of the frame F1, and then, the CMOS sensor photographs each scanning line by turns from the top part of the following frame F2 to the bottom part thereof.

It is assumed that an object Obj whose center locates at (x1, y1) in the frame F1 moves to (x2, y2) in the frame F2. That is, moving distance in the horizontal and the vertical directions are "x2−x1" and "y2−y1", respectively. Hereinafter, the moving distance in the horizontal direction will be called as a horizontal direction motion vector MVx (=x2−x1), and the moving distance in the vertical direction will be called as a vertical direction motion vector MVy (=y2−y1).

Here, when it is assumed that a scanning line including (x1, y1) of the frame F1 is photographed at time t0, a scanning line including (x2, y2) of the frame F2 is photographed at time "t1=t0+ts*(MVy+H)". Therefore, it takes "t1−t0=ts*(MVy+H)" for the object Obj to move by a distance of the horizontal direction motion vector MVx. Accordingly, a horizontal direction moving distance "dx" and a vertical direction moving distance "dy" of the object Obj during photographing one scanning line (hereinafter, referred to as per a scanning line) are expressed by the following equations (1) and (2), respectively.

$$dx = MVx/(t1-t0) = MVx/\{ts*(MVy+H)\} \quad (1)$$

$$dy = MVy/(t1-t0) = MVy/\{ts*(MVy+H)\} \quad (2)$$

Because the bottom part of the object Obj is photographed after the top thereof is photographed, the moving distance of the bottom part of the object Obj is larger than that of the top part thereof. As a result, the object Obj may be distorted as shown in FIG. 1.

Therefore, a horizontal direction correction amount MODx[y] and a vertical direction correction amount MODy[y] for each scanning line "y" are calculated according to the following equations (3) and (4), respectively. Here, time "ts*y" corresponds to time necessary to photograph first to y-th scanning lines.

$$MODx[y] = dx*ts*y = MVx*y/(MVy+H) \quad (3)$$

$$MODy[y] = dy*ts*y = MVy*y/(MVy+H) \quad (4)$$

If a pixel at (x, y) and a first scanning line were photographed at the same time, the correction amounts MODx[y] and MODy[y] mean that the pixel at (x, y) would locate at (x−MODx[y], y−MODy[y]). Therefore, the focal plane distortion is corrected by replacing the pixel at (x−MODx[y], y−MODy[y]) by the pixel at (x, y), in other words, by replacing the pixel at (x, y) by the pixel at (x+MODx[y], y+MODy[y]).

As discussed above, the horizontal direction moving distance "dx" and the vertical direction moving distance "dy" are calculated by the above equations (1) and (2) in consideration of the vertical direction motion vector MVy. Then, the correction amounts MODx[y] and MODy[y] for each scanning line are calculated based on the moving distances "dx" and "dy" per a scanning line, thereby correcting the focal plane distortion accurately.

FIG. 2 is a schematic block diagram showing an image processing system according to a first embodiment. The image processing system has a CMOS sensor 1, an image processing device 2 and an outside apparatus 3. An input video signal, which is a RAW data acquired by the CMOS sensor 1, is inputted to the image processing device 2. The image processing device 2 corrects the focal plane distortion on the input video signal to generate an output video signal. The outside apparatus 3 is, for example, a display such as liquid crystal display for displaying the output video signal or a recording medium such as a flash memory or hard disk for recording the output video signal.

The image processing device 2 has a pre-processor 11, a frame memory 12, a motion vector generator 13, a correction amount generator 14, and a correcting module 15. Although the present embodiment shows an example where the CMOS sensor 1 is provided separately from the image processing device 2, it is possible to mount the CMOS sensor 1 and the image processing device 2 on one chip.

The pre-processor 11 RGB-interpolates the RAW data inputted from the CMOS sensor 1 to generate RGB values of each pixel. Then, the pre-processor 11 matrix-converts the RGB values to generate a Y (brightness) component. The generated RGB values and the Y component are stored in the frame memory 12. The frame memory 12 can, for example, store pixel information of two frames. Here, the RGB values of pixel located at (x, y) of each frame are stored in addresses (x, y) corresponding to each frame in the frame memory 12, respectively.

The motion vector generator 13 performs motion vector search by using the Y component of the present frame inputted from the CMOS sensor 1 and the Y component of the past frame stored in the frame memory 12, to generate one horizontal direction motion vector MVx and one vertical direction motion vector MVy by a frame. The generated motion vectors MVx and MVy are inputted to the correction amount generator 14.

More specifically, some blocks (for example, five blocks) having multiple pixels are set in a frame, and the motion vector search is performed by block-matching operation using a sum of absolute difference between the blocks. Then, an average or a median of motion vectors of all blocks is set as a motion vector of the frame. In another manner, the present and the past frames are scaled-down, and the motion vector search is performed by a scanning line to temporarily store the searched motion vector in a line memory (not shown) for motion vectors in the motion vector generator 13. Then, a median of motion vectors of all scanning lines is set as a motion vector of the frame.

Furthermore, the image encoder (not shown) and so on can be provided separately from the image processing device 2 to supply the motion vector to the motion vector generator 13. In this case, it is unnecessary to use the Y components of the present and the past frames.

The correction amount generator 14 generates the horizontal direction correction amount MODx[y] and the vertical direction correction amount MODy[y] in consideration of the vertical direction motion vector MVy using the motion vector MVx and MVy and the number of total scanning lines "H" set from outside such as a host processor (not shown) based on the following equations (5) and (6).

$$MODx[y]=MVx*y/(MVy+H) \quad (5)$$

$$MODy[y]=MVy*y/(MVy+H) \quad (6)$$

The equations (5) and (6) correspond to the equations (3) and (4), respectively. The correction amounts MODx[y] and MODy[y] are inputted to the correcting module 15. Note that, the scanning line position "y" can be obtained by counting the number of pulses of the horizontal synchronization signal Hsync. In the present embodiment, decimal parts are cut off or rounded off, for example, so that the correction amounts MODx[y] and MODy[y] become integer numbers.

FIG. 3 is a block diagram showing an example of an internal configuration of the correction amount generator 14. The correction amount generator 14 has multipliers 21 and 22, an adder 23, and dividers 24 and 25. The first multiplier 21 generates "MVx*y". The adder 23 generates "MVy+H". The first divider 24 divides the "MVx*y" generated by the multiplier 21 by the "MVy+H" generated by the adder 23 to generate the horizontal direction correction amount MODx[y]. The second multiplier 22 generates "MVy*y". The second divider 25 divides the "MVy*y" generated by the multiplier 22 by the "MVy+H" generated by the adder 23 to generate the vertical direction correction amount MODy[y].

The correcting module 15 of FIG. 2 corrects the input video signal by using the correction amounts MODx[y] and MODy[y] and the RGB values of the present frame stored in the frame memory 12. More specifically, the correcting module 15 replaces the RGB values of a pixel located at (x, y) by those of a pixel located at (x+MODx[y], y+MODy[y]).

FIG. 4 is a block diagram showing an example of an internal configuration of the correcting module 15. The correcting module 15 has counters 31 and 32, and adders 33 and 34. The horizontal synchronization signal Hsync is inputted to the counter 31. The counter 31 calculates the position "x" by repeating count-up while resetting the count value in synchronization with assert of the horizontal direction synchronization signal Hsync. The adder 33 adds the position "x" to the horizontal direction correction amount MODx[y] to generate a horizontal direction address ADRx (=x+MODx[y]). The vertical direction synchronization signal Vsync and the horizontal direction synchronization signal Hsync are inputted to the counter 32. The counter 32 calculates the position "y" by counting-up the number of the horizontal direction synchronization signal Hsync while resetting the count value in synchronization with assert of the vertical direction synchronization signal Vsync. The adder 34 adds the position "y" to the vertical direction correction amount MODy[y] to generate a vertical direction address ADRy (=y+MODy[y]). Then, the RGB values stored at the address (ADRx, ADRy) are read out from the frame memory 12 to set as the corrected output video signal. By such a manner, the focal plane distortion can be suppressed.

FIG. 5 is a flowchart showing the processing operation of the image processing device 2. It is assumed that the Y component and the RGB values of a frame F1 are stored in the frame memory 12. When the input video signal of a frame F2, which follows the frame F1, is inputted, the pre-processor 11 generates the RGB values and the Y component (S1).

Next, the motion vector generator 13 generates the motion vectors MVx and MVy using the Y component of the present frame F2 and that of the past frame F1 stored in the frame memory 12 (S2). Then, the RGB values and the Y component stored in the frame memory 12 are updated to RGB values and the Y component of the frame F2 (S3).

After that, the correction amount generator 14 generates the correction amounts MODx[y] and MODy[y] in consideration of the horizontal direction motion vector MVy by each scanning line position "y" based on the above equations (5) and (6), respectively (S4). Then, the correcting module 15 corrects the RGB values located at position (x, y) by using the modification amounts MODx[y] and MODy[y] and the RGB values of the frame F1 stored in the frame memory 12 (S5). The output video signal including the corrected RGB values is supplied to the outside apparatus 3.

As stated above, in the first embodiment, the input video signal is corrected by using the correction amounts MODx[y] and MODy[y] which are generated in consideration of the horizontal direction motion vector MVy. Therefore, the focal plane distortion can be corrected with high accuracy.

Note that, although the frame memory 12 stores pixel information of two frames in the above example, it is not always necessary to provide a memory for storing two frames. For example, it is possible to use a frame memory for storing one frame and a line memory for storing a predetermined number of lines. Here, the predetermined number corresponds to a maximum among a maximum of the modification amount MODy[y] necessary for the correction of the vertical direction and a maximum of the horizontal direction of the motion vector searching range necessary for the motion vector search.

(Second Embodiment)

The correction amount generator 14 of the first embodiment generates the correction amounts MODx[y] and MODy[y] using only the number of total scanning lines "H" set from outside. On the other hand, the correction amount generator 14 of a second embodiment generates the correction amounts MODx[y] and MODy[y] using more parameters set from outside.

FIG. 6 is a schematic block diagram of the image processing system according to a second embodiment. In FIG. 6, components common to those of FIG. 2 have common reference numerals, respectively. Hereinafter, components different from FIG. 2 will be mainly described below.

The correction amount generator 14a in the image processing device 2a of the image processing system of FIG. 6 is different from the correction amount generator 14 of FIG. 2. The number of total scanning lines "H", an arbitrary coefficient "a" and a bit shift amount Sft are set to the correction amount generator 14a as parameters. Then, the correction amount generator 14a generates the horizontal direction modification amount MODx[y] and the vertical direction modification amount MODy[y] based on the following equations (7) and (8), respectively.

$$MOD\, x[y] = MVx*y*a/(MVy+H) >> Sft \quad (7)$$

$$MOD\, y[y] = MVy*y*a/(MVy+H) >> Sft \quad (8)$$

Here, ">>" means bit-shifting by the bit shift amount Sft, which is equal to dividing by $2^{Sft}$. That is, the modification amounts MODx[y] and MODy[y] according to the above equations (7) and (8) are obtained by multiplying those according to the above equations (5) and (6) by the coefficient "a" and dividing them by $2^{Sft}$, respectively. In the second embodiment, the bit shift amount Sft is defined depending on the coefficient "a" so that the correction amounts MODx[y] and MODy[y] become integer numbers.

By generating the correction amounts MODx[y] and MODy[y] based on the above equations (7) and (8) respectively, the correction amounts can be adjusted flexibly using the parameters set from outside. For example, when the correction amounts want to be set small in order to suppress wrong correction, the coefficient "a" is set smaller than a value corresponding to one. Because the correction amounts MODx[y] and MODy[y] proportional to the coefficient "a", the adjustment can be performed simply.

Especially, when the image processing device 2a is implemented by hardware, it is possible to adjust the correction amounts with downsized hardware by multiplying the coefficient "a" and bit-shifting comparing to a case where another divider is provided in the hardware.

Figure 7:
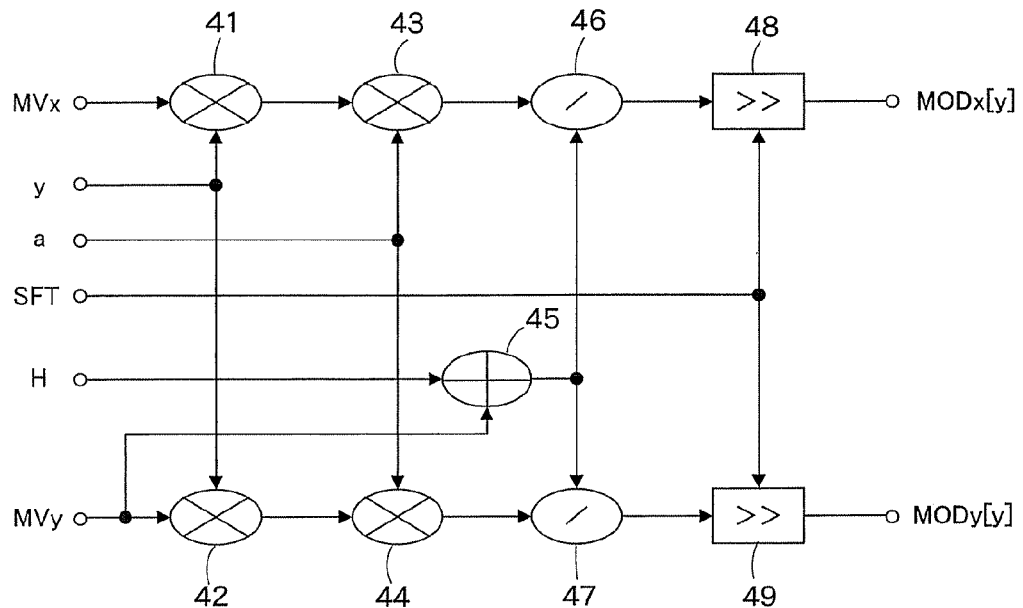

FIG. 7 is a block diagram showing an internal configuration of the correction amount generator 14a. The correction amount generator 14a has multipliers 41 to 44, an adder 45, dividers 46 and 47, bit shifters 48 and 49. The first multiplier 41 generates "MVx*y". The second multiplier 43 generates "MVx*y*a". The adder 45 generates "MVy+H". The first divider 46 divides the "MVx*y*a" generated by the multiplier 43 by the "MVy*H" generated by the adder 45 to generate "MVx*y*a/(MVy+H)". The first bit shifter 48 bit-shifts the "MVx*y*a/(MVy+H)" by the bit shift amount Sft to generate the horizontal direction modification amount MODx[y]. The third multiplier 42 generates "MVy*y". The fourth multiplier 44 generates "MVy*y*a". The second divider 47 divides the "MVy*y*a" generated by the multiplier 44 by the "MVy*H" generated by the adder 45 to generate "MVy*y*a/(MVy+H)". The second bit shifter 49 bit-shifts the "MVy*y*a/(MVy+H)" by the bit shift amount Sft to generate the vertical direction modification amount MODy[y].

Then, similar to the first embodiment, the input video signal is corrected using the generated correction amounts MODx[y] and MODy[y].

As stated above, in the second embodiment, the coefficient "a" and the bit shift amount Sft, in addition to the first embodiment, are set from outside to generate the correction amounts MODx[y] and MODy[y]. Therefore, the correction amounts can be simply adjusted.

(Third Embodiment)

In the first and the second embodiments, the correction amounts MODx[y] and MODy[y] are integer numbers, and the correction is performed by replacing the correction target pixel by one of pixels present in the frame. On the other hand, in a third embodiment, which will be described below, the correction amounts MODx[y] and MODy[y] are decimal numbers, and the correction is performed by replacing the correction target pixel by a pixel generated by interpolation using one or more pixels.

Figure 8:
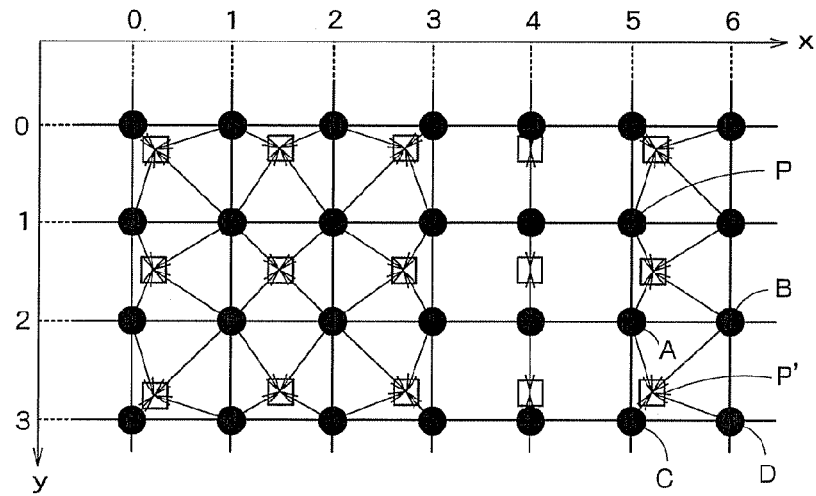
FIG. 8 is a diagram for explaining the correction according to the third embodiment.

FIG. 8 is a diagram for explaining the correction according to the third embodiment. FIG. 8 shows an example where the correction amounts MODx[y] and MODy[y] having decimal two bits, that is, a unit of "0.25", are calculated. Black circles of FIG. 8 show locations of pixels read out from the frame memory, the locations locating only on integer coordinates. On the other hand, white rectangles show locations of pixels having a possibility to be replaced, the locations locating on coordinates whose unit is "0.25". The pixels located at these locations are generated by interpolation.

For example, a pixel located at a position P(5, 1), having a horizontal direction correction amount MODx[1] of "0.25" and a vertical direction correction amount MODy[1] of "1.75", should be replaced by a pixel located at a position P'(5.25, 2.75). Practically, a pixel does not exist on the position P'(5.25, 2.75). Therefore, RGB values of the pixel located at the position P'(5.25, 2.75) are generated by convolution operation (filter operation) interpolation using RGB values of adjacent pixels, for example pixels located at positions A(5, 2), B(6, 2), C(5, 3) and D(6, 3). Then, the RGB values of the pixel located at P(5, 1) are replaced by the RGB values of the pixel located at P'(5.25, 2.75) generated by the interpolation. By such a manner, correction accuracy improves by controlling the decimal parts of the correction amounts MODx[y] and MODy[y].

In order to calculate the decimal parts of the correction amounts MODx[y] and MODy[y], decimal parts are calculated by using the equations (5) and (6) in the first embodiment, or the bit shift amount Sft is set small in the second embodiment.

Figure 9:
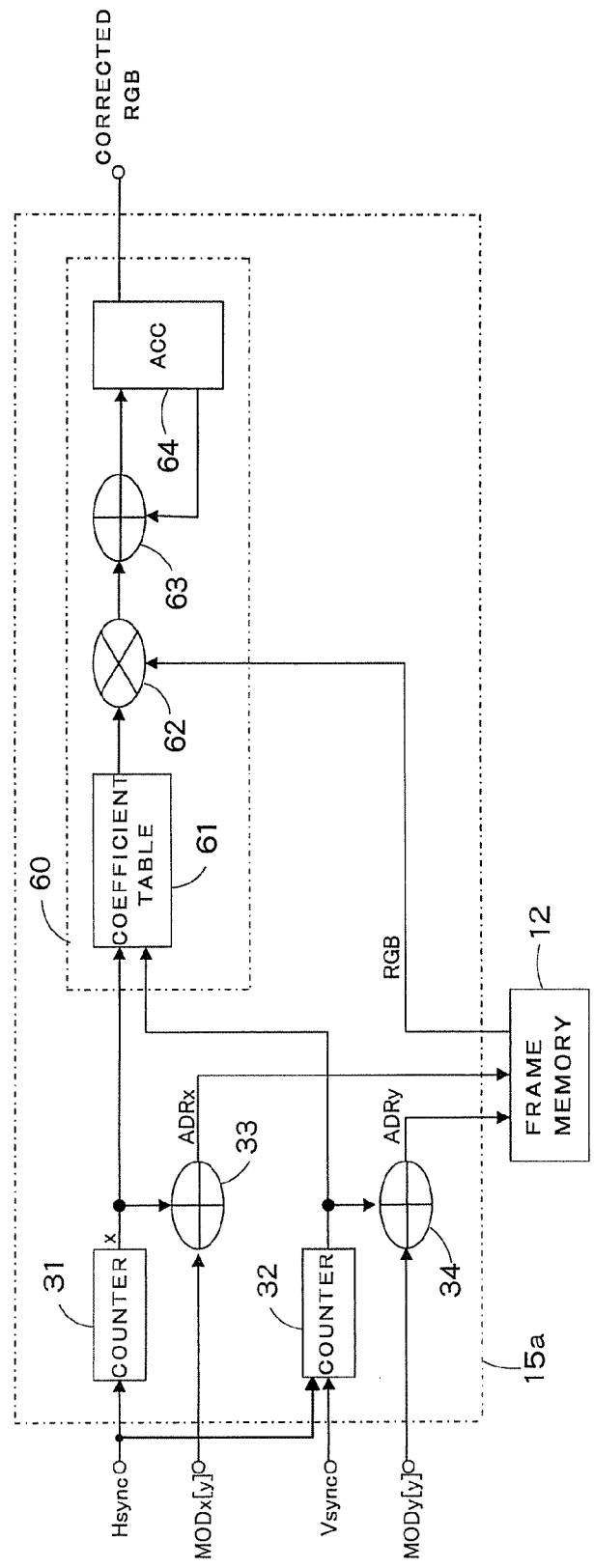
FIG. 9 is a block diagram showing an example of an internal configuration of the correcting module 15a according to the third embodiment.

FIG. 9 is a block diagram showing an example of an internal configuration of the correcting module 15a according to the third embodiment. The correcting module 15a has counters 31 and 32, adders 33 and 34, and an interpolator 60. The interpolator 60 has a coefficient table 61, a multiplier 62, an adder 63 and an accumulator (ACC) 64.

Hereinafter, the operation of the correcting module 15a of FIG. 9 will be explained in a condition same as FIG. 8. The counters 31 and 32 calculate positions "x" and "y", respectively. Furthermore, the adders 33 and 34 generate the horizontal direction address ADRx (=x+MODx[y]) and the vertical direction address ADRy (=y+MODy[y]), respectively. Here, because the correction amounts MODx[y] and MODy[y] have decimal parts of two bits, the addresses ADRx and ADRy also have decimal parts of two bits.

Then, the RGB values of pixels locating on integer coordinates around the address (ADRx, ADRy) are read out. The multiplier 62 multiplies a filter coefficient stored in the coefficient table 62 determined according to a distance to the address (ADRx, ADRy) by each of the read-out RGB values, and an output of the multiplier 62 is accumulated by the adder 63 and the accumulator 64.

In the example of FIG. 8, the above processing are performed with respect to the addresses (5, 2), (6, 2), (5, 3) and (6, 3) locating around the address (5.25, 2.75). The RGB values of address (5, 3) are multiplied by a filter coefficient of a relatively large value since the distance to the address (5.25, 2.75) are small. On the other hand, the RGB values of address (6, 2) are multiplied by a filter coefficient of a relatively small value since the distance to the address (5.25, 2.75) are large The RGB values obtained by such a manner are set as the corrected RGB values.

In the present embodiment, multiple times of accesses to the frame memory 12 are performed per one pixel in the convolution operation on calculating the RGB values by interpolation. However, because of data locality in the frame in the convolution operation, power consumption and/or memory access latency can be decreased by providing a frame memory reference cache (not shown) between the frame memory 12 and the correcting module 15a or a memory reference controller (not shown).

Note that, although the correction amounts MODx[y] and MODy[y] have decimal parts of two bits in the third embodiment, the correction amounts MODx[y] and MODy[y] can have further decimal parts. Additionally, any interpolation manner is applicable, and RGB values of more than four pixels or only one most adjacent pixel can be used for interpolation.

As stated above, in the third embodiment, the decimal parts of the correction amounts MODx[y] and MODy[y] are calculated, and correction is performed by using the RGB values of a pixel generated by interpolation using one ore more pixels. Therefore, the correction amounts can be controlled more finely, thereby improving the correction accuracy.

Note that, it is enough that the input video signal of the first to the third embodiments is photographed in an order of the scanning lines, and the input video signal can be photographed not the CMOS sensor but other image pickup apparatus.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. An image processing device comprising:
a motion vector generator configured to generate a motion vector of an input video signal captured per scanning line, the motion vector comprising a horizontal component and a vertical component;
a correction amount generator configured to generate a first correction amount based on the motion vector per scanning line, and to generate a second correction amount based on the vertical component of the motion vector per scanning line; and
a correcting module configured to correct the input video signal to produce an output video signal based on the first correction amount and the second correction amount,
wherein the correction amount generator is configured to generate the first correction amount based on a following equation (1), and the second correction amount based on a following equation (2):

$$MODx[y]=MVx*y/(MVy+H) \tag{1}$$

$$MODy[y]=MVy*y/(MVy+H) \tag{2}$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, and the "H" is the number of total scanning lines.

2. The device of Claim 1, wherein the correction amount generator comprises:

a first multiplier configured to multiply the horizontal component of the motion vector by the position of the scanning line of the pixel to be corrected;

an adder configured to add the vertical component of the motion vector to the number of total scanning lines;

a first divider configured to produce the first correction amount by dividing an output of the first multiplier by an output of the adder;

a second multiplier configured to multiply the vertical component of the motion vector by the position of the scanning line of the pixel to be corrected; and a second divider configured to produce the second correction amount by dividing an output of the second multiplier by the output of the adder.

3. An image processing device comprising:

a motion vector generator configured to generate a motion vector of an input video signal captured per scanning line, the motion vector comprising a horizontal component and a vertical component a correction amount generator configured to generate a first correction amount based on the motion vector per scanning line, and to generate a second correction amount based on the vertical component of the motion vector per scanning line; and a correcting module configured to correct the input video signal to produce an output video signal based on the first correction amount and the second correction amount, wherein the correction amount generator is configured to generate the first correction amount based on a following equation (3), and to generate the second correction amount based on a following equation (4):

$$MODx[y]=MVx*y*a/(MVy+H)>>Sft \quad (3)$$

$$MODy[y]=MVy*y*a/(MVy+H)>>Sft \quad (4)$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, the "H" is the number of total scanning lines, the "a" is an arbitrary coefficient, and the Sft is a bit shift amount.

4. The device of claim 3, wherein the correction amount generator comprises:

a first multiplier configured to multiply the horizontal direction motion vector by the position of the scanning line of the pixel to be corrected;

a second multiplier configured to multiply an output of the first multiplier by the arbitrary coefficient;

an adder configured to add the vertical component of the motion vector to the number of total scanning lines;

a first divider configured to divide an output of the second multiplier by an output of the adder;

a first bit-shifter configured to produce the first correction amount by bit-shifting an output of the first divider by the bit shift amount;

a third multiplier configured to multiply the vertical component of the motion vector by the position of the scanning line of the pixel to be corrected;

a fourth multiplier configured to multiply an output of the third multiplier by the arbitrary coefficient;

a second divider configured to divide an output of the fourth multiplier by the output of the adder; and a second bit-shifter configured to produce the second correction amount by bit-shifting an output of the second divider.

5. The device of claim 1, where in the correcting module is configured to replace a pixel to be corrected by a pixel located at a position shifted by the horizontal direction correction amount and the second correction amount from a position of the pixel to be corrected.

6. The device of claim 1, wherein when at least one of the first correction amount and the second correction amount have a decimal portion, the correcting module is configured to generate a first pixel at a position shifted by the first correction amount and the second correction amount from a pixel to be corrected by using one or more pixel around the first pixel, and is configured to replace the pixel to be corrected by the first pixel.

7. An image processing system comprising:

a pickup apparatus configured to capture an image per scanning line and to generate an input video signal from the captured image;

a motion vector generator configured to generate a motion vector of the input video signal, the motion vector comprising a horizontal component and a vertical component;

a correction amount generator configured to generate a first correction amount based on the motion vector per scanning line, and to generate a second correction amount based on the vertical component of the motion vector per scanning line; and a correcting module configured to correct the input video signal to produce an output video signal based on the first correction amount and the second correction amount, wherein the correction amount generator is configured to generate the first direction correction amount based on a following equation (5), and to generate the second correction amount based on a following equation (6):

$$MODx[y]=MVx*y/(MVy+H) \quad (5)$$

$$MODy[y]=MVy*y/(MVy+H) \quad (6)$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, and the "H" is the number of total scanning lines.

8. The system of claim 7, wherein the pickup apparatus is a Complementary Metal-Oxide-Semiconductor (CMOS) sensor.

9. The system of claim 7 further comprising a display configured to display the output video signal.

10. The system of claim 7 further comprising a recording medium configured to store the output video signal.

11. The system of claim 7, wherein the correction amount generator comprises:

a first multiplier configured to multiply the horizontal component of the motion vector by the position of the scanning line of the pixel to be corrected;

an adder configured to add the vertical component of the motion vector to the number of total scanning lines;

a first divider configured to produce the first correction amount by dividing an output of the first multiplier by an output of the adder;

a second multiplier configured to multiply the vertical component of the motion vector by the position of the scanning line of the pixel to be corrected; and a second divider configured to produce the second correction amount by dividing an output of the second multiplier by the output of the adder.

12. An image system comprising:
- a pickup apparatus configured to capture scanning line and to generate an input video signal from the captured image;
- a motion vector generator configured to generate a motion vector of the input video signal, the motion vector comprising a horizontal component and a vertical component;
- a correction amount generator configured to generate a first correction amount based on the motion vector per scanning line, and to generate a second correction amount based on the vertical component of the motion vector per scanning line; and
- a correcting module configured to correct the input video signal to produce an output video signal based on the first correction amount and the second correction amount,
- wherein the correction amount generator is configured to generate the first correction amount based on a following equation (7), and the second correction amount is generated based on a following equation (8):

$$MODx[y] = MVx*y*a/(MVy+H) >> Sft \quad (7)$$

$$MODy[y] = MVy*y*a/(MVy+H) >> Sft \quad (8)$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, the "H" is the number of total scanning lines, the "a" is an arbitrary coefficient, and the Sft is a bit shift amount.

13. The system of claim 12, wherein the correction amount generator comprises:
- a first multiplier configured to multiply the horizontal component of the motion vector by the position of the scanning line of the pixel to be corrected;
- a second multiplier configured to multiply an output of the first multiplier by the arbitrary coefficient;
- an adder configured to add the vertical component of the motion vector to the number of total scanning lines;
- a first divider configured to divide an output of the second multiplier by an output of the adder;
- a first bit-shifter configured to produce the first correction amount by bit-shifting an output of the first divider by the bit shift amount;
- a third multiplier configured to multiply the vertical component of the motion vector by the position of the scanning line of the pixel to be corrected;
- a fourth multiplier configured to multiply an output of the third multiplier by the arbitrary coefficient;
- a second divider configured to divide an output of the fourth multiplier by the output of the adder; and
- a second bit-shifter configured to produce the second correction amount by bit-shifting an output of the second divider.

14. The system of claim 7, where in the correcting module is configured to replace a pixel to be corrected by a pixel located at a position shifted by the first correction amount and the second correction amount from a position of the pixel to be corrected.

15. The system of claim 7, wherein when at least one of the horizontal direction correction amount and the vertical direction correction amount have decimal parts, the correcting module is configured to generate a first pixel at a position shifted by the horizontal direction correction amount and the vertical direction correction amount from a pixel to be corrected by using one or more pixel around the first pixel, and is configured to replace the pixel to be corrected by the first pixel.

16. An image processing method comprising:
- generating a motion vector of an input video signal captured per scanning line, the motion vector comprising a horizontal component and a vertical component;
- generating a first correction amount based on the motion vector per scanning line;
- generating a second correction amount based on the vertical component of the motion vector per scanning line; and
- correcting the input video signal to an output video signal based on the first correction amount and the second correction amount,
- wherein the first correction amount is generated based on a following equation (9), and the second correction amount is generated based on a following equation (10):

$$MODx[y] = MVx*y/(MVy+H) \quad (9)$$

$$MODy[y] = MVy*y/(MVy+H) \quad (10)$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, and the "H" is the number of total scanning the method performed programmatically by an image processing device that comprises one or more physical computers.

17. The method of claim 16, wherein the first correction amount is generated based on a following equation (11), and the second correction amount is generated based on a following equation (12):

$$MODx[y] = MVx*y*a/(MVy+H) >> Sft \quad (11)$$

$$MODy[y] = MVy*y*a/(MVy+H) >> Sft \quad (12)$$

where, the MODx[y] is the first correction amount, the MODy[y] is the second correction amount, the MVx is the horizontal component of the motion vector, the MVy is the vertical component of the motion vector, the "y" is a position of the scanning line of a pixel to be corrected, the "H" is the number of total scanning lines, the "a" is an arbitrary coefficient, and the Sft is a bit shift amount.

* * * * *